United States Patent [19]

Gundy

[11] Patent Number: 5,029,907
[45] Date of Patent: Jul. 9, 1991

[54] BAND FOR EFFECTING A SEAL

[75] Inventor: William P. Gundy, Milford, N.H.

[73] Assignee: NPC, Inc., Milford, N.H.

[21] Appl. No.: 513,216

[22] Filed: Apr. 23, 1990

Related U.S. Application Data

[63] Continuation of Ser. No. 338,981, Apr. 14, 1989, abandoned.

[51] Int. Cl.$^5$ .............................. F16L 3/04; F16L 5/02; F16L 21/08
[52] U.S. Cl. ...................................... 285/158; 24/270; 24/494; 29/237; 16/225; 16/DIG. 13; 16/226; 285/162; 285/194; 285/237; 285/236; 285/230
[58] Field of Search ............... 285/158, 162, 194, 214, 285/237, 236, 230, 370, 397; 24/270, 494; 29/157 R, 237; 16/225, DIG. 13, 226

[56] References Cited

U.S. PATENT DOCUMENTS

| 285,240 | 9/1883 | Doyle | 16/374 X |
|---|---|---|---|
| 2,483,304 | 9/1949 | Vogel | 16/226 X |
| 2,535,789 | 12/1950 | Debell | 16/374 X |
| 2,880,017 | 3/1959 | Anderson | 285/409 X |
| 3,958,313 | 5/1976 | Rossborough | 285/162 X |
| 4,369,715 | 1/1983 | Ingersoll | 16/226 X |
| 4,387,900 | 6/1983 | Ditcher | 285/230 X |
| 4,532,675 | 8/1985 | Salazar | 16/374 X |
| 4,702,645 | 10/1987 | Skinner | 285/230 X |
| 4,746,127 | 5/1988 | Westhoff | 285/237 X |
| 4,793,163 | 12/1988 | MacFarlane | 16/374 X |

FOREIGN PATENT DOCUMENTS

| 0816362 | 7/1969 | Canada | 16/225 |
|---|---|---|---|
| 0298345 | 10/1928 | United Kingdom | 16/374 |

OTHER PUBLICATIONS

Burns, Edgar, "How to Design an Integral Hinge", *Modern Plastics*, Oct. 1963, pp. 166-168.

*Primary Examiner*—Dave W. Arola
*Assistant Examiner*—Carol I. Bordas
*Attorney, Agent, or Firm*—Pearson & Pearson

[57] ABSTRACT

A band assembly for effecting a seal particularly adapted for use in establishing a joint between a sewer pipe and a reinforced concrete manhole riser. The seal is affected by a tapered elastomeric tubular connector boot and a clamping band member that expands one end of the boot into the surface of the riser wall. The band assembly comprises a clamping band and a separate toggle expander. The clamping band includes separated end sections that capture the ends of the toggle expander. When the toggle expander is forced into an expanded position, the clamping band forces the connector boot into contact with the manhole riser. The clamping band includes stiffening lips and the toggle expander also incudes stiffening lips to provide a rigid structure. In one embodiment a tab overlies the end sections in the space of the clamping band and the space therebetween to further improve the evenness of the sealing force applied to the connector boot.

18 Claims, 2 Drawing Sheets 5,029,907

BAND FOR EFFECTING A SEAL

This is a continuation of my application Ser. No. 07/338,981, filed Apr. 14, 1989 now abandoned.

BACKGROUND OF THE INVENTION

1. Field of the Invention

This invention generally relates to sealing arrangements for pipe joints and more specifically to an improved clamping device for effecting a seal between a pipe and a manhole.

2. Description of Related Art

Various proposals exist for connecting pipes to manholes in sewer systems. For example, U.S. Pat. No. 3,958,313 for a Method, Apparatus and Product for Improved Pipe-to-Manhole Sealing issued May 25, 1976 to the same assignee as the present invention discloses an underground joint between a sewer pipe and a reinforced concrete manhole riser. A flexible boot slips over the free end of the pipe and an external clamp compresses the seal onto the pipe to produce a boot-to-pipe seal. The other end of the boot penetrates an aperture in a manhole through a normally core-drilled opening in a riser wall. The end of the boot fits in the aperture. A clamping assembly with a clamping band and an integral toggle expander fits inside the boot in alignment with the riser wall. When the toggle expander is operated, it expands the band into the boot and compresses the boot against the riser to produce a boot-to-riser seal.

Occasionally it is necessary to remove the connector from the riser because of improper installation of the seal or an incorrectly sized clamping assembly. In these cases both the clamping band and toggle, which constitute an integral unit, must be replaced.

Core drilling through a concrete riser wall produces a porthole of nominal diameter, but occasionally because of core drill out-of-roundness caused by damage, the actual size will vary. Optimum sealing then requires an accomodation which was difficult to realize with an integral toggle and clamp. The clamping band and toggle also include three hinge joints. These joints require special machining operations that add to the manufacturing costs.

SUMMARY

Therefore it is an object of this invention to provide an improved clamping mechanism for forcing a seal into contact with a sealing surface.

It is another object of this invention to provide a clamping band that produces a uniform sealing force around the periphery of the seal.

Still another object of this invention is to provide a clamping band assembly that can be adjusted to accommodate variations in opening size.

Yet another object of this invention is to provide a clamping band and toggle assembly that is less expensive to manufacture.

Still yet another object of this invention is provide a clamping band and toggle assembly for providing a seal wherein the toggle can be replaced as required.

In accordance with this invention, an improved clamping mechanism forces a resilient material against a sealing surface with a clamping member and a separate toggle expander. The clamping member has first and second end sections that are separated to produce a sealing force as the separation between the ends increases. The toggle expander comprises a one-piece or integral unit with first and second ends that are nested in the respective end sections of the clamping member and an intermediate section that can be forced from a first to a second position thereby to increase the separation between the first and second ends of the clamping member.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
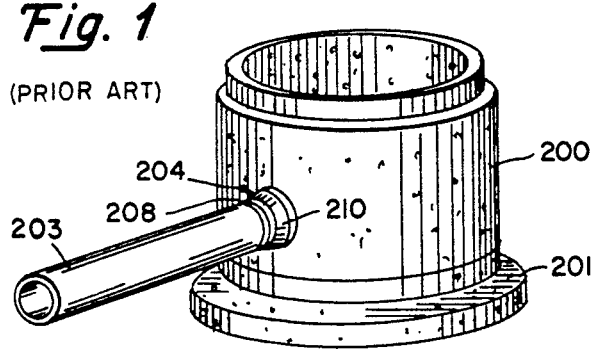
FIG. 1 is a perspective view of a sewer pipe and manhole riser sealably joined together by means of a connector boot of the type illustrated in FIG. 2.
Figure 2:
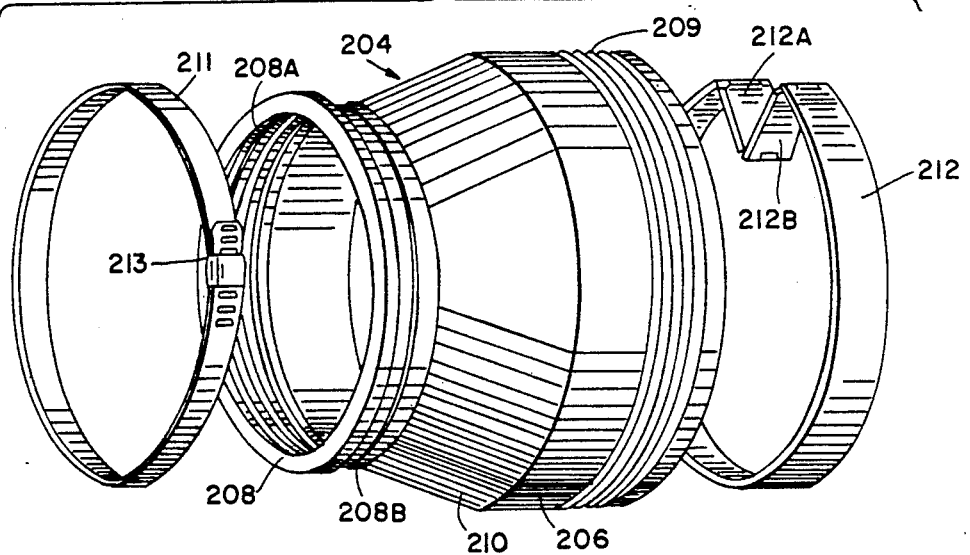
FIG. 2 is an exploded view showing in perspective sealing joint components of the prior art.

FIGS. 1 and 2 correspond to FIGS. 16 and 18 in U.S. Pat. No. 3,958,313 and also use the same reference numerals. By way of background, FIG. 1, discloses a manhole riser 200 mounted on a base 201 and having formed therein, by core drilling or other similar procedure, a port hole into which the extremity of a pipe 203 is inserted. The outer diameter of the pipe 203 is appreciably smaller than the inner diameter of the port hole.

The pipe 203 and the riser 200 are held in sealably joined relationship by a clamp pipe connector boot assembly generally denoted by arrow 204. A connector boot assembly 204 using a clamping band of the prior art is shown in more detail removed from the riser and pipe in FIG. 2.

As shown more clearly in FIG. 2, the connector boot 204 comprises an elongated, flexible tubular body having an internal clamping end 206 of a cylindrical shape and size suitable for loosely engaging within a porthole. Located around the outer surface of the clamping end 206 are spaced beads or ribs 209 which are deformable under pressure to fill in irregularities in the riser porthole edge in the fully clamped position.

Pressure is exerted against the clamping end 206 by an internal clamping band 212 which includes a toggle expander device consisting of toggle arms 212A and 212B. The band and toggle arms can be forced into a position in which they are essentially aligned such that band 212 becomes expanded under relatively high pressures and the end 206 of the connector boot 204 thereby is compressed solidly against the porthole edge. When an external device forces the toggle expander arms 212A and 212B into an aligned position, the toggle arms move outwardly and radially of the porthole and provide an overcenter travel which positions the arm in a self-locking position so they constantly maintain pressure on the clamping band 212.

At its opposite extremity, the tubular connector body 204 is formed with an external clamping end 208 also of a cylindrical shape, but appreciably smaller than the end 206 so as to loosely engage around the outer periphery of the pipe 203 in FIG. 1. This end 208 is also formed with a series of beads 208A. An external clamping band 211 located in a channel 208B is solidly clamped by screwdriver pressure exerted through a tightening screw 213. This pressure deforms the beads 208A and clamps the end 208 in tightly sealed relationship around the pipe.

Extending between the parts 206 and 208 of the connector boot is an intermediate flexible tubular body portion 210 which is of a gradually decreasing size and designed to yieldably join the parts 206 and 208 together so that relative movement of one to the other may take place under varying stress forces.

Figure 3:
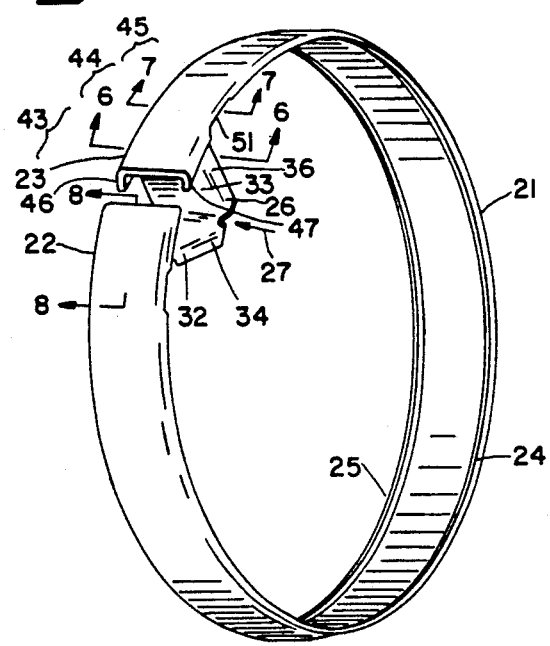
FIG. 3 is a perspective view of a clamping assembly as it is configured prior to effecting a seal.
Figure 4:
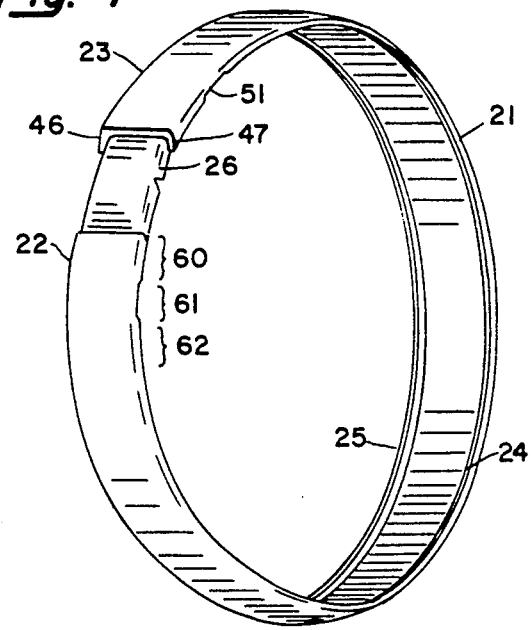
FIG. 4 is a perspective view of the clamping assembly shown in FIG. 3 after the seal is effected.

Referring now to FIGS. 3 and 4, a clamping assembly constructed in accordance with this invention comprises an clamping band 21 formed by stamping metal, such as stainless steel, into a flat member with end sections 22 and 23 and upturned lips or lip means 24 and 25 along the length thereof. Then the material can be rolled into a generally circular form as shown in FIGS. 3 and 4 with a slight separation or gap between the end sections 22 and 23. As will be apparent from the prior art, forcing the end sections 22 and 23 to the position shown in FIG. 4 increases the overall circumference of the band and, therefore, the radius of the band. It is this radial increase that forces the end 206 of the boot 204 shown in FIG. 2 into a sealing relationship with the riser wall 200 shown in FIG. 1.

Figure 5:
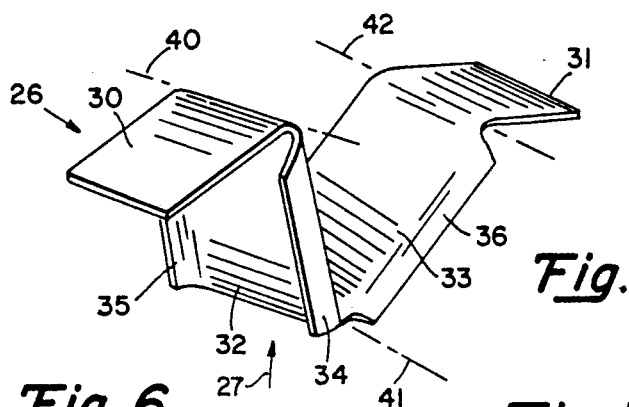
FIG. 5 is a detailed perspective view of a toggle expander useful in this invention.

FIG. 5 discloses a discrete, replaceable one piece toggle expander 26 that provides the increased separation between the end sections 22 and 23 in FIGS. 3 and 4 when a force is applied to the toggle expander 26. In this specific embodiment, the force is applied radially along an axis 27. Like the clamping band 20, the toggle expander 26 is formed from a flat metallic piece, such as sheet stainless steel. The piece would be punched to form an outline of the toggle expander 26 and then stamped into the configuration shown in FIG. 5. Referring to FIGS. 3 through 5, the toggle expander 26 has first and second end portions 30 and 31 formed as generally rectangular tabs with surfaces that conform generally to the inner surface of the clamping band 20 adjacent the end portions 22 and 23. Two intermediate sections, or links, 32 and 33 extend from the end portions 30 and 31 at an angle to form an interconnecting toggle element having a generally vee shape. Lips 34 and 35 stamped along the edges of the link 32 and similar lips, including lip 36, along the edges of the link 33 provide strength and rigidity to the links 32 and 33.

When the end sections 30 and 31 are constrained against movement in the direction of a force along the axis 27 and are free to move in a direction transverse to that force, a sufficient force will deform the toggle about transverse axes 40, 41 and 42 that lie at the junctures of the end section 30 and the link 32, the links 32 and 33, and the link 32 and the end section 31, respectively.

With sufficient force, the material adjacent the axis 41 will displace toward the end sections 31 and 32. As the lips, including lips 35 through 36, prevent deformation of the links 32 and 33, the entire toggle expander is deformed into a planar shape as shown in FIG. 4 so the end sections 30 and 31 move apart from each other. When the links 32 and 33 are substantially aligned with the end sections 30 and 31, the toggle expander 26 becomes a very rigid structure in compression and maintains the increased separation between the end sections 22 and 23 of the clamping member 20.

Figure 6:
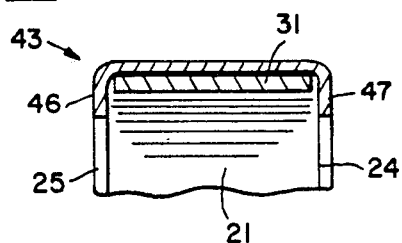
FIG. 6 is a cross-sectional view taken along lines 6—6 in FIG. 3.
Figure 7:
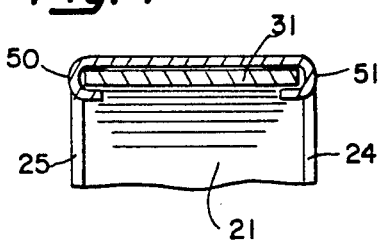
FIG. 7 is a cross-sectional view taken along lines 7—7 in FIG. 3.

The structure at each of the end sections 22 and 23 constituted a receiving means for the toggle expander 26 that nests with the end sections 31 and 32 of the toggle expander 26 and provides abutments against which the end section 31 and 32 act. The structure of each end section is similar and the specific structure that captures the toggle expander 26 at the end section 23 is shown in detail in FIGS. 3 and 6 through 8. Referring first to FIG. 3, the end section 23 has three functional portions. A first portion 43 acts as a guide for the end 31 of the toggle expander 26 and guides the end 31 toward a channel section 44 to a stop section 45. As shown in FIG. 6, the guide portion 43 is formed by transverse lips 46 and 47 that extend from the band 21.

Normally, a toggle expander 26 is inserted before the clamping band 21 is inserted into a seal. The end sections 22 and 23 are pulled apart sufficiently to allow the toggle expander 26 to be inserted into the guide section 43. The end sections 30 and 31 normally are held against the inner surface of the clamping band 21. When the clamping band 21 is released, it relaxes and the end sections 21 and 22 move toward each other relative to the toggle expander 26. Specifically the end 31 moves toward the stop means or section 46, first encountering a transition between the guide portion 43 and the channel portion 44 shown in FIG. 7 and formed by rolling or otherwise bending lip portions 50 and 51 into a generally U-shape to allow the end 31 to slide between that portion of the lip parallel to the band 21 and the band 21 itself. In this position, the toggle expander 26 is nested in the end sections 22 and 23 of the clamping band. and can be carried with the clamping band 21. Moreover, this nested relationship permits relative movement between the end sections 22 and 23 and the end sections 30 and 31.

Figure 8:
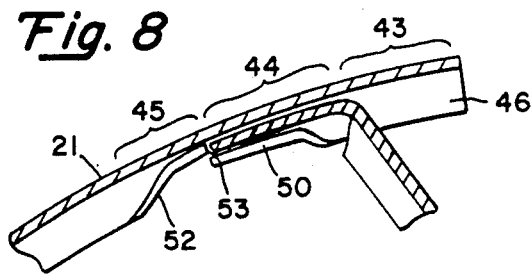
FIG. 8 is a cross-sectional view taken along lines 8—8 in FIG. 3.

When pressure is applied to the toggle expander 26 and begins to deform the toggle expander 26, the ends 30 and 31 move apart and move relative to the band 21. Eventually the end 31 reaches the stop section 45 made by bending the lips 24 and 25 back on themselves such that there is a long transition portion 52 between the lips 24 and 25 and an end 53 on each side of the clamping band 21 as shown in FIG. 8. Thus when the end 31 engages the stop 53 and the end 30 engages a similar stop on the end section 22, further separation of the ends 30 and 31 translates directly into an increased separation of the end sections 22 and 23.

The end portions 43, 44 and 45 have been described in detail. Similar guide, capture and stop portions 60, 61 and 62, respectively, are formed in the end section 22.

From the foregoing description, it will now be apparent that the toggle expander 26 is a replaceable element. It is not integral with the clamping band itself. Moreover, the length of the toggle expander 26 can be readily adjusted at an installation site by cutting the end portions 30 and 31 or by adding shims thereby to accommodate variations in the overall size of an aperture through the sealing member such as the riser 200 in FIG. 1. Both the toggle expander 26 and the clamping band 20 are easily manufactured by conventional stamping and rolling procedures. The various lips in the clamping band 21 and toggle expander 26 provide improved rigidity and minimize the possibility of leakage around the seal.

Figure 9:
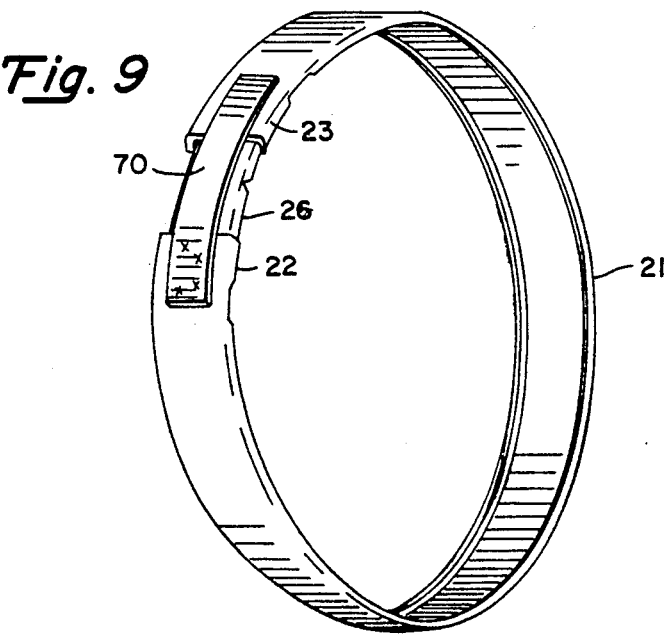
FIG. 9 depicts a modification of the clamping assembly shown in FIGS. 3 and 4.

FIG. 9 illustrates a modification to the clamping band 21 shown in FIGS. 3 and 4 in the form of an overlying tab 70 attached by a welding or other similar process to the outer surface of one end section (i.e., the end section 22 in FIG. 9), and extending over the gap between the end sections 22 and 23 and over a portion of the end section 23. As the toggle expander 26 flattens and separates the end sections 22 and 23, the tab 70 constrains the motion of the end sections 22 and 23 to a tangential direction. This minimizes the possibility of a radial motion that could deform the clamping band and produce uneven sealing forces around the circumference. Moreover, the tab 70 also produces a sealing force that would not otherwise be produced in the vicinity of the gap between the end sections 22 and 23.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a clamping system including a circular clamping member with first and second end sections, including stop means and having a first separation therebetween, toggle expander means for increasing the separation between the first and second end sections thereby to force the clamping member into a clamping position, said toggle expander means comprising, as a one-piece member:
   A. first and second toggle end means for nesting in and being movable over a limited circumferential distance relative to the first and second end sections of the clamping member respectively, and
   B. central expander means positioned between and parallel to said first and second toggle end means transverse axes, defining a central transverse axis, said material of said toggle expander means being bendable about said axes in response to a substantially transverse force against said central expander means at said central axis thereby to move said first and second toggle end means into abutment with the stop means and thereafter to increase the separation between the first and second end sections of the clamping band.

2. A clamping system as recited in claim 1 wherein said central expander means has a vee shape formed of first and second planar links that extend respectively between the first and central transverse axes and between the second and central transverse axes with an apex at the central transverse axis, a force being applied to said apex to straighten said links to a common plane.

3. A clamping system as recited in claim 2 wherein each of said links comprises integral lip members extending transversely to the each of said planar links.

4. A clamping system as recited in claim 2 wherein said first and second toggle means have surface configurations that correspond to the surface configurations of the first and second end sections of the clamping member.

5. A system for clamping an article against a sealing surface including a clamping member with first and second ends defining a predetermined separation therebetween and expansion means for increasing the separation thereby to force the clamping member into sealing engagement with the sealing surface, the improvement wherein said clamping member is a one-piece member comprising:
   A. an elongated clamping band corresponding to the configuration of the sealing surface, said clamping band having first and second end sections at the ends thereof and an intermediate section with longitudinal edge sections,
   B. integral lip means formed transversely to said clamping band along each of said longitudinal edge sections of said intermediate section, and
   C. receiving means formed along each of said longitudinal edge sections of said first and second end sections for nesting in end sections of the expansion means and for the expansion means to move over a limited circumferential distance relative to the first and second end sections of the clamping member thereby to enable the expansion means to increase the separation between said first and second end sections of said clamping member.

6. A clamping member for a clamping system as recited in claim 5 wherein first portions of each of said receiving means define guide means adjacent the end sections for guiding the expansion means to other portions of said receiving means.

7. A clamping member for a clamping system as recited in claim 6 wherein second portions of each of said receiving means define channel means for receiving the end sections of the expansion means in a nested relationship within said second portions.

8. A clamping member for a clamping system as recited in claim 7 wherein third portions of each of said receiving means define stop means for abutting the expansion means thereby to limit relative motion between said end sections of said clamping member and the expansion means.

9. A clamping member for a clamping system as recited in claim 5 wherein said flexible clamping band means additionally comprises tab means affixed to one of said first and second clamping band end sections and overlying said second end section and the separation therebetween.

10. A clamping system for sealing a flexible sealing member in a circular configuration against a circular sealing surface surrounding the sealing member, said system comprising:
   A. a flexible circular clamping band means for disposition inside the sealing member having first and second separated, juxtaposed receiving end sections, each of said receiving end section having stop means formed therein, and
   B. one-piece toggle expander means including:
      i. first and second toggle end sections for nesting in said first and second clamping means receiving end sections respectively, and being movable over a limited circumferential distance relative to said end sections, and
      ii. expansible means between said first and second toggle end sections for separating said toggle end sections a predetermined distance, said expansible means being deformable to increase the separation between said toggle end sections thereby initially to move said toggle end sections into said stop means and thereafter to increase the separation between said receiving end sections to force said clamping band against the sealing member and to effect a seal between the sealing member and the sealing surface.

11. A seal clamping system as recited in claim 10 wherein said toggle expander expansible means has a vee shape and includes first and second planar links that extend between transverse axes at said end sections and are joined at an apex at a central transverse axis parallel to the other transverse axes but displaced therefrom, a force being applied to said apex to straighten said links.

12. A seal clamping system as recited in claim 11 wherein each of said links comprises integral lip means extending transversely to the planes of said links.

13. A seal clamping system as recited in claim 10 wherein said clamping band receiving end sections have a predetermined surface configuration and include means for nesting the end sections of said toggle expander means, said first and second end sections of said toggle expander means, having surface configurations conforming to the surface configurations of the first and second receiving end sections of said clamping band.

14. A seal clamping system as recited in claim 13 wherein said flexible clamping band means additionally comprises an intermediate section with longitudinal edge sections and integral lip means formed transversely to said intermediate section along each of said longitudinal edge sections.

15. A seal clamping system as recited in claim 14 wherein said clamping band means additionally includes receiving means lip means formed along longitudinal edge sections of said first and second receiving end sections with first portions of said receiving end lip means at each of said first and second receiving end sections defining guide means for guiding said toggle end sections of said toggle expander means with respect to said receiving end sections of said clamping band means.

16. A seal clamping system as recited in claim 15 wherein said receiving end lip means have second portions adjacent said first portions for nesting said toggle end sections.

17. A seal clamping system as recited in claim 16 wherein third portions of said receiving end lip means at said first and second clamping band end sections define stop means for abutting said toggle end sections.

18. A seal clamping system as recited in claim 13 wherein said flexible clamping band means additionally comprises a tab means affixed to one of said first and second clamping band end sections and overlying said second end section and the separation therebetween.

* * * * *

Disclaimer 5,029,907 — William P. Gundy, Milford, NH (US). BAND FOR EFEECTNG A SEAL. Patent dated Jul. 9, 1991. Disclaimer filed Oct. 27, 2003. by the assignee, NPC, Inc.

Hereby enters this disclaimer to claims 1-18 of said patent.

*(Official Gazette, August 10, 2004)*